United States Patent [19]

Bauer

[11] 4,036,208
[45] July 19, 1977

[54] FINNED TUBE SOLAR ENERGY ABSORBER

[75] Inventor: Carl F. Bauer, Chicago, Ill.

[73] Assignee: UOP Inc., Des Plaines, Ill.

[21] Appl. No.: 645,119

[22] Filed: Dec. 29, 1975

[51] Int. Cl.² .............................................. F24J 3/02
[52] U.S. Cl. .................................... 126/271; 165/183
[58] Field of Search ............... 126/270, 271; 237/1 A; 60/641; 165/183

[56] References Cited

U.S. PATENT DOCUMENTS

| 3,299,881 | 1/1967 | Koch | 126/271 |
| 3,923,038 | 12/1975 | Cutchaw | 126/271 |

FOREIGN PATENT DOCUMENTS

| 1,108,431 | 8/1955 | France | 126/271 |

*Primary Examiner*—Kenneth W. Sprague
*Assistant Examiner*—James C. Yeung
*Attorney, Agent, or Firm*—James R. Hoatson, Jr.; Barry L. Clark; William H. Page, II

[57] ABSTRACT

Energy absorber for a solar collector assembly comprises an array of closely spaced, parallel tube portions having very high fins which present a large area of exposure to the source of radiation. The finned portions of the absorber are positioned between layers of thin, transparent plastic sheeting. The plastic sheeting contacts most of the circumference of the fins and defines generally closed cell portions between the side walls of adjacent fins which are evacuated so as to minimize convection type heat losses.

5 Claims, 3 Drawing Figures

FINNED TUBE SOLAR ENERGY ABSORBER

SUMMARY OF THE INVENTION

It is among the objects of the present invention to provide an efficient, low cost, easily manufactured flat plate type solar collector which utilizes tubing but does not require any type of flat plate surface of any flat plate type of absorber surface to be mounted, soldered or welded to the tubular surface.

My improved solar energy absorber comprises a plurality of generally parallel lengths of finned tubing. Preferably, the tubing is high fin aluminum clad copper tubing such as Type L/C tubing manufactured by Wolverine Division of UOP Inc. The height of the fins should be as great as possible, while the internal diameter of the tubing should not exceed 0.375–0.500 inches. An outer fin diameter of at least one inch and preferably close to 2 inches is desirable in order to maximize the fin area exposed to the sun while minimizing the amount of tubing required. The tubing can be bent in serpentine fashion after portions of its fins are removed, or are not provided in the first place, so that all of the heat transfer fluid passes through all of the tubing. Alternatively, a plurality of parallel lengths of finned tubing can be mounted between inlet and outlet headers so that the flow will be divided. The serpentine configuration can also incorporate U-shaped fittings at each end to reverse the flow. The fins on adjacent parallel sections of tubing are preferably positioned very close together, about 0.010–0.050 inches so as to capture as much radiation as possible. The tubing sections are also preferably positioned in a generally vertical direction with their axes at an angle between 20° and 60° to the ground, depending on the latitude, so that the sun will impinge on the flat side surfaces of the fins.

The tubular energy absorber is preferably positioned in formed channels in an unskinned urethane foam insulator block located in the bottom of a solar collector housing which may have extruded aluminum sides, for example. This foam is used because of its lower thermal conductivity and because it can be used as a structural support for the fin-tube energy absorber.

To further act as a thermal barrier to the heat energy lost by the fin-tube energy absorber, the entire fin tube absorber is wrapped in a 2 mil skin of plastic film such as the polyvinyl fluoride type sold under the trademark Tedlar. Such a plastic material can be molded over the fin tube absorber surface to Act as a cover and, therefore, a barrier to heat loss from the absorber surface. it is important that this initial barrier be molded to the fin tips of the fin tube absorber. This can be done by either wrapping the absorber in a loose-fitting plastic skin or by heat forming the plastic skin to the fin-tube absorber surface. The enclosed space is then preferably evacuated using vacuum techniques.

By constructing the first cover in the above manner, it is apparent that numerous cells bounded on two sides by aluminum fin, and on the other two sides by plastic material are produced. These cells will decrease the overall heat loss from the solar collector because they will limit the amount of convective heat loss from the surface of the fin tube absorber, particularly if a vacuum seal around the absorber is maintained.

Placed at a distance of ½ inch or more above the upper tips of the plastic covered fin tube absorber is the second cover of the solar collector. This cover, made of glass (such as window glass or specially treated non-reflective glass), should be about 3/16 inch thick and will act to protect the materials used to construct the collector from the environment and other degradation. It will also act to reduce the amount of heat energy lost from the absorber surface. The entire apparatus should be no greater than 5 to 6 inches in height, and depending on overall design considerations should be no less than about 2 feet wide and 4 feet long and probably no larger than about 4 feet wide and 15 feet long.

DESCRIPTION OF THE PREFERRED EMBODIMENT

Figure 1:
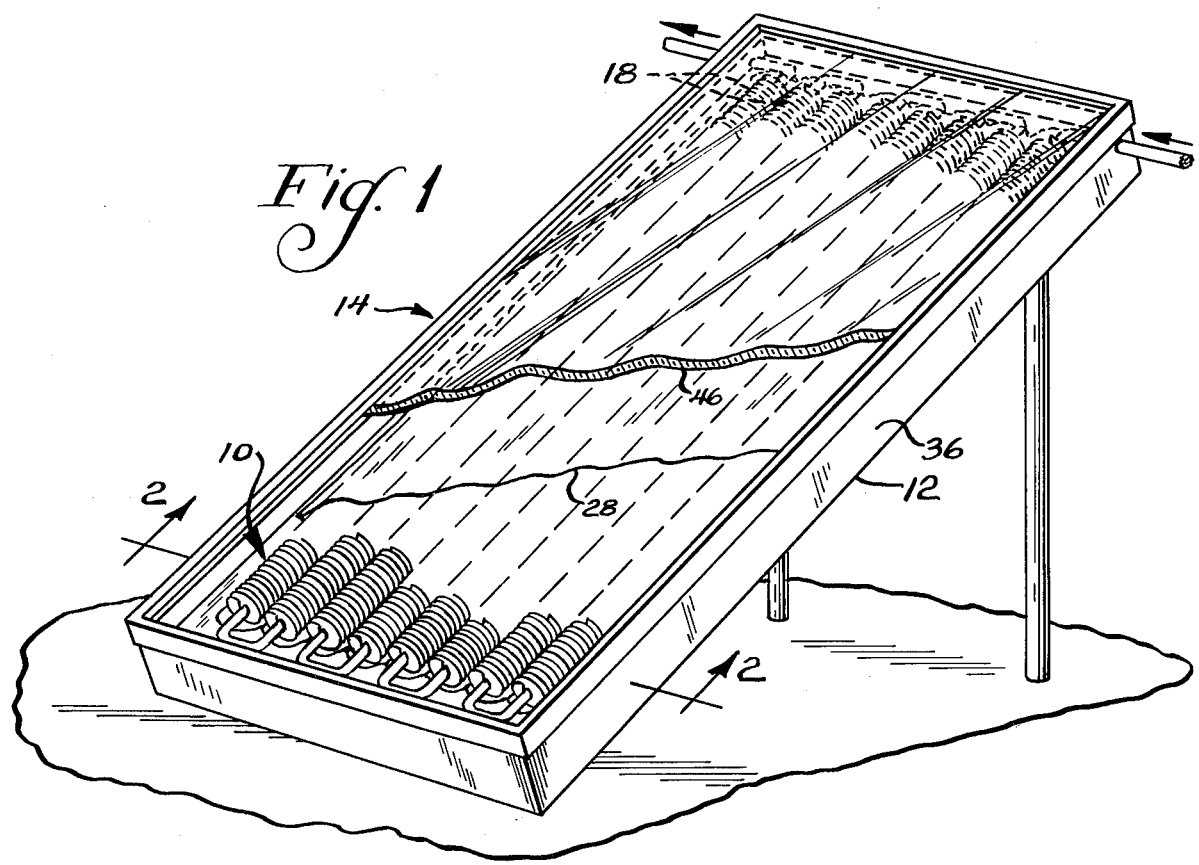
FIG. 1 is a perspective view showing a solar collector incorporating the improved energy absorber.

Referring to the drawings, FIG. 1 shows my improved absorber assembly 10 mounted in a housing 12 as part of a solar collector 14. The absorber assembly 10 comprises a series of straight tube portions 18 which are preferably formed of a copper inner tube 20 and an aluminum outer tube 22 having integral fins 24. To maximize heat transfer to a fluid such as water flowing through the tube 20, the tube is preferably of a relatively small size. An outer diameter of 0.375 inches has been found to be quite suitable. The fins 24 have an outer diameter at least twice the outer diameter of inner tube 20 and preferably between one and two inches so as to fill the area inside the housing 12 with a maximum amount of energy collection surface for a minimum amount of tubing. The fins 24 can be annular or helical but are preferably formed in a helix to simplify manufacture and number about 9–16 per inch of length of tubing. The height of the fins should be greater than the space between fins. By tilting the solar collector 14 at an angle in the range of 20°–60° from the horizontal, depending on the latitude, the solar rays can be made to impinge on the wide side surfaces of the fins 24. The parallel adjacent tube portions 18 are preferably positioned as close to each other as possible so that a minimum of energy will be lost by impingement on open areas between the rows of tubes when the sun's rays are directly overhead.

Figure 2:
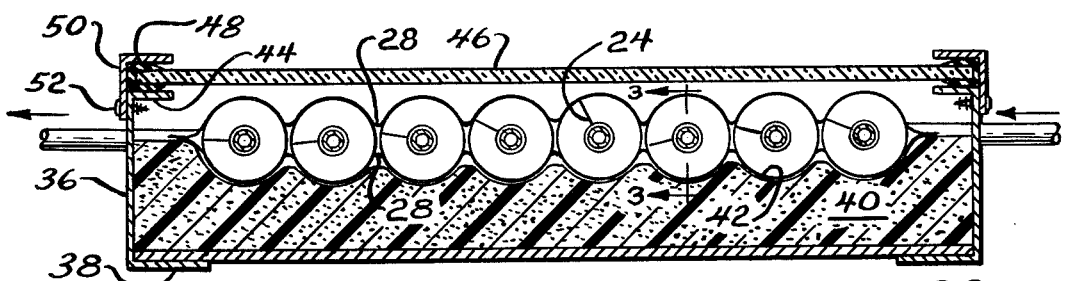
FIG. 2 is a front sectional view taken on line 2—2 of FIG. 1.
Figure 3:
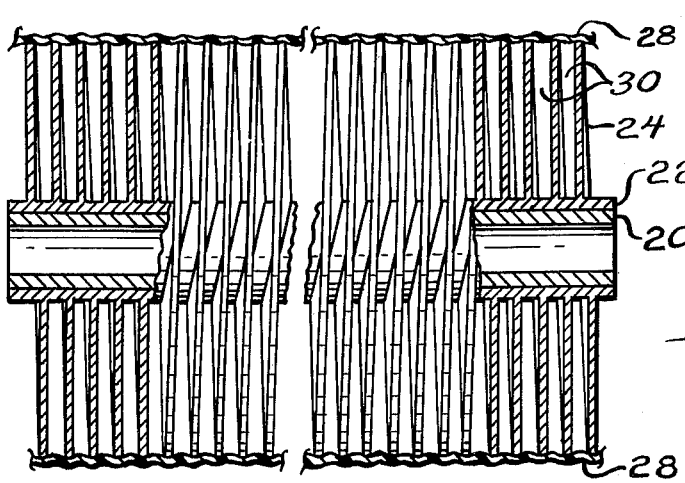
FIG. 3 is a sectional view taken on line 3—3 of FIG. 2.

To permit solar rays to reach the fins 24 while minimizing reradiation and convection losses, the absorber assembly 10 is sealed between two sheets 28 of a plastic capable of withstanding the temperatures encountered in a solar collector. A suitable plastic of this purpose is a thin sheet of a transparent polyvinyl fluoride such as the type sold under the trademark Tedlar. The outer edges of the plastic sheets 28 can be heat sealed or ultrasonically welded to ech other and the enclosed space can then be evacuated through a tube (not shown) which passes through one of the edges. The plastic sheets 28 encompass almost the entire circumference of each fin 24 as shown in FIG. 2 and cooperate with the side walls of the fins 24 and the outer wall of tube 22 to form substantially closed chambers 30. Although the enclosed chambers 30 provide the best protection against heat loss by convection when they are evacuated, they would also offer substantial protection against convection heat losses even if they were not evacuated since the chambers or compartments 30 are very small and are separated from each other.

The absorber assembly 10 can be housed very economically in the housing 12 to define a solar collector 14 since it does not require any metal base plate. The housing 12 can be formed of a plurality of extruded aluminum channels 36 as shown in FIG. 2. The channels 36 include a bottom flange 38 which supports a rigid plastic urethane foam insulating base 40. The top of the base 40 includes a series of pre-formed grooves 42 which loosely support the absorber assembly 10. An upper flange 44 on channels 36 forms a shelf for a sheet of glass 46 which can be retained in a flexible gasket 48 and held down by angle members 50 and screws 52. The glass 46 protects the underlying absorber and also reduces the re-radiation of energy to the atmosphere. To enhance the heat transfer efficiency of the absorber 10 the fins 24 are preferably blackened by anodization or other techniques.

I claim as my invention:

1. A solar energy absorber comprising a plurality of closely spaced, generally parallel, finned tube portions having spaced, radially extending fins whose outer diameter is at least about twice the internal diameter of the tubing and whose height is greater than the space between fins, said plurality of finned tube portions being arranged in a generally planar array, a pair of sheets of plastic film overlying and underlying said finned tube portions, each of said sheets being in tight contact with the respective upper or lower outer peripheral surface of said fins along at least the major portion of the respective upper or lower circumferential portion of each fin, said sheets of plastic film cooperating with the side walls of said fins and the outer surface of the tubing to define a series spaced, substantially closed compartments which limit convection heat loss from said absorber.

2. A solar energy absorber in accordance with claim 1 wherein said sheets of plastic film are sealed together and the space between them is evacuated.

3. A solar energy absorber in accordance with claim 1 wherein said sheets of plastic film comprise polyvinyl fluoride.

4. A solar energy absorber in accordance with claim 1 wherein said sheets of plastic film are transparent and said fins have a black surface.

5. A solar energy absorber in accordance with claim 1 wherein said finned tube portions include a copper inner tube and an aluminum outer tube having said fins integral therewith.

* * * * *